UNITED STATES PATENT OFFICE.

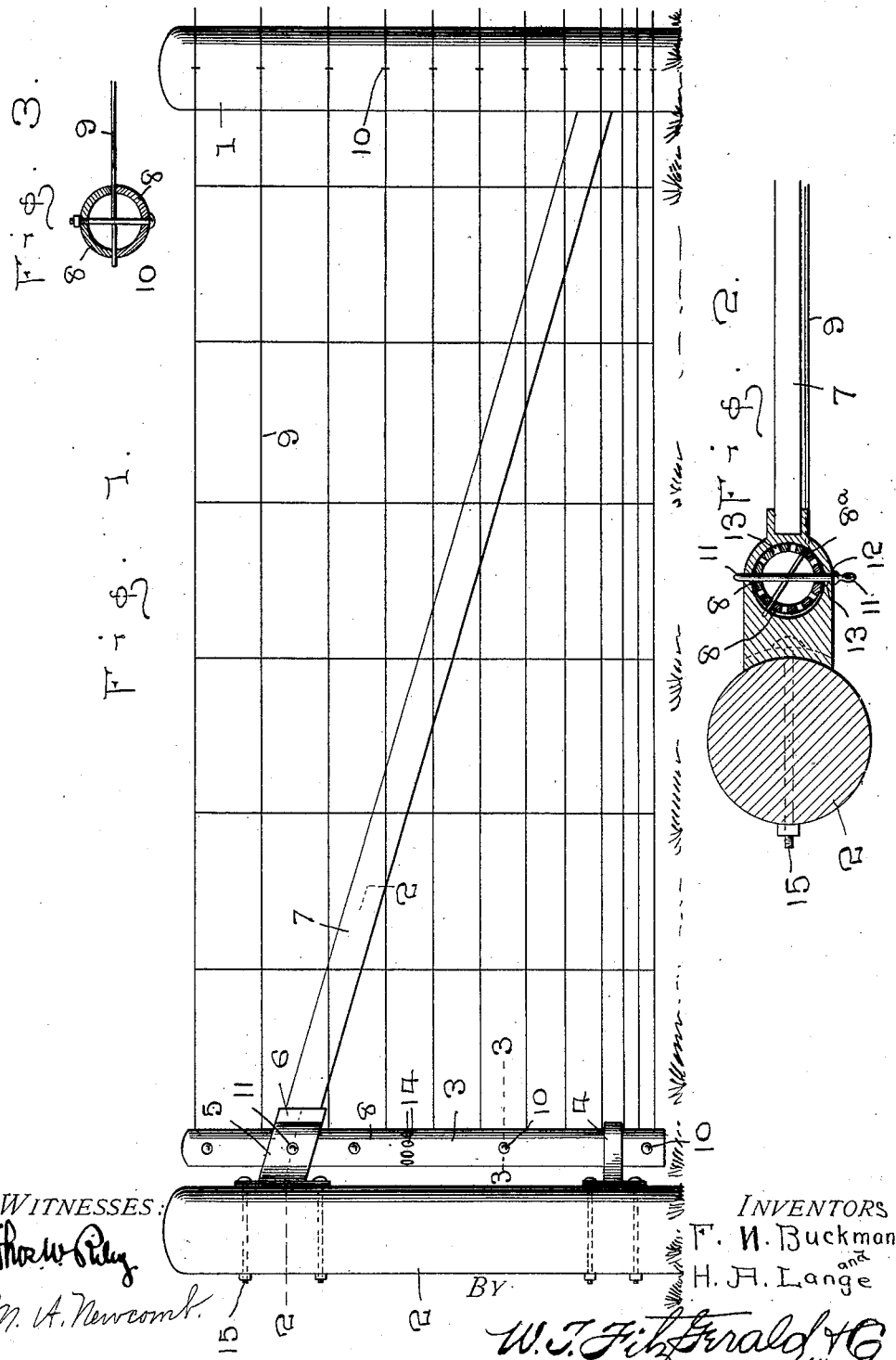

FREDERICK N. BUCKMAN AND HERMAN A. LANGE, OF GREEN BAY, WISCONSIN.

FENCE-WIRE TIGHTENER.

No. 924,630.      Specification of Letters Patent.      Patented June 15, 1909.

Application filed November 25, 1908. Serial No. 464,363.

*To all whom it may concern:*

Be it known that we, FREDERICK N. BUCKMAN and HERMAN A. LANGE, citizens of the United States, residing at Green Bay, in the county of Brown and State of Wisconsin, have invented certain new and useful Improvements in Fence-Wire Tighteners; and we do hereby declare the following to be a full, clear, and exact description of the invention, such as will enable others skilled in the art to which it appertains to make and use the same.

Our invention relates to new and useful improvements in fence wire tighteners and has relation more particularly to that class wherein is employed a hand bar or lever for exerting the requisite tightening strain.

Said invention has for its object to carry out the aforesaid purpose in a simple, effective and economical manner.

It also has for its object to reduce the number of parts to the minimum and to effect the stressing or tightening operation with facility and expedition.

A further object is to provide a combined brace and tightening device for fence wires and to provide for the ready assembling of the same in effective position.

Other objects and advantages will be hereinafter referred to and more particularly pointed out in the claim.

In the accompanying drawings which are made a part of this application, Figure 1 is a side elevation of a fence section embodying said invention. Fig. 2 is a transverse section as seen on line 2—2, Fig. 1. Fig. 3 is a like section taken on the line 3—3, Fig. 1.

Referring to the drawings in which similar reference numerals designate corresponding parts throughout the several views, 1 and 2 refer to fence posts, and contiguous to the post 2 is arranged a bar 3 received by brackets 4 and 5 suitably bolted or fastened to said post 2, which may be the corner one.

The bracket 6 is arranged obliquely or at an angle less than a right angle with relation to its securing plate and is provided with a socket 6, which receives the upper end of an oblique or diagonal brace 7, the lower end of said brace suitably bearing in the post 1 near the lower end of the latter.

The bar 3 is formed in semi-circular sections or members 8, between which are clamped or held the otherwise free ends of the fence wires 9 in proximity to the corner post 2, said sections being held together by bolts 10, as clearly indicated in Fig. 3, the bar 3 also being retained in position in the brackets 4 and 5 by means of a pin 11 passed through openings 12 in the bracket 5 and through openings of a series 13 in the bar and which pin 11 may be readily removed when it is desired to tighten or put the wires under stress as presently seen. The thus formed bar 3 is provided with an additional series of circularly arranged openings 14, about midway its length for the reception of a hand bar or lever (not shown) for delivering the requisite rotation or turns to said bar, as in effecting the stretching or tightening of the fence wires, as will be readily understood. Previous to such turning of the bar 3, the pin 11 is withdrawn as above-noted and re-inserted after the stretching operation of the wires is performed, thus holding the same in effective position.

It will be noted from the foregoing that a very simple and effective means is provided for readily and quickly stressing or tightening the fence wires whenever this may be needed and said wires thus held against undue relaxation or loosening and whereby suitable means is provided for the ready application of the stretching device to a corner post of a fence.

What we claim is:

A device of the character described, comprising a rotatable bar formed of longitudinal sections adapted to be placed on opposite sides of wires, bolts extending through the sections of the bar and at right angles to the trend of the wires, said bolts being adapted to clamp the sections on the wires, supporting brackets for said bar, and a pin extending through one of said brackets and through the interposed portion of the bar, said pin being adapted to retain said bar against rotation and longitudinal movement, said pin-engaged bracket having means to engage one end of a post brace.

In testimony whereof we have signed our names to this specification in the presence of two subscribing witnesses.

FRED. N. BUCKMAN.
                 HERMAN A. LANGE.

Witnesses:
     ALVIN PERLEWITZ,
     FRANK CHERNEY.